United States Patent
Médioni et al.

(10) Patent No.: US 10,403,303 B1
(45) Date of Patent: Sep. 3, 2019

(54) SYSTEMS AND METHODS FOR IDENTIFYING SPEECH BASED ON CEPSTRAL COEFFICIENTS AND SUPPORT VECTOR MACHINES

(71) Applicant: GoPro, Inc., San Mateo, CA (US)

(72) Inventors: Tom Médioni, Paris (FR); Vincent Garcia, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 83 days.

(21) Appl. No.: 15/802,115

(22) Filed: Nov. 2, 2017

(51) Int. Cl.
| | |
|---|---|
| G10L 25/24 | (2013.01) |
| G10L 25/30 | (2013.01) |
| G10L 25/78 | (2013.01) |
| G10L 25/21 | (2013.01) |
| G10L 15/22 | (2006.01) |
| G10L 25/18 | (2013.01) |

(52) U.S. Cl.
CPC .............. *G10L 25/21* (2013.01); *G10L 15/22* (2013.01); *G10L 25/18* (2013.01); *G10L 25/24* (2013.01)

(58) Field of Classification Search
CPC .............. G10L 21/0272; G10L 21/028; G10L 21/0308; G10L 25/18; G10L 25/21; G10L 25/27; G10L 25/30; G10L 25/78; G10L 2025/783; G10L 25/24
USPC ................................. 704/205, 206, 210, 232
See application file for complete search history.

(56) References Cited

U.S. PATENT DOCUMENTS

| | | | | |
|---|---|---|---|---|
| 7,236,929 B2 * | 6/2007 | Hodges | ................... | G10L 25/78 704/233 |
| 8,311,813 B2 * | 11/2012 | Valsan | ................... | G10L 25/78 704/213 |
| 8,311,821 B2 * | 11/2012 | Breebaart | ............... | G06F 16/70 704/234 |
| 8,762,144 B2 * | 6/2014 | Cho | ........................ | G10L 25/84 704/214 |
| 8,843,369 B1 * | 9/2014 | Sharifi | ................... | G10L 25/03 704/235 |
| 8,892,231 B2 * | 11/2014 | Cheng | ...................... | G10L 25/81 704/211 |
| 9,892,745 B2 * | 2/2018 | Dimitriadis | ............. | G10L 25/78 |
| 2005/0071160 A1 * | 3/2005 | Huang | .................... | G10L 15/02 704/233 |
| 2005/0086052 A1 * | 4/2005 | Shih | ........................ | G10L 25/90 704/207 |

(Continued)

*Primary Examiner* — Martin Lerner
(74) *Attorney, Agent, or Firm* — Esplin & Associates, PC (57) ABSTRACT

Audio content may have a duration. The audio content may be segmented into audio segments. Individual audio segments may correspond to a portion of the duration. Mel frequency spectral power features, Mel frequency cepstral coefficient features, and energy features of the audio segments may be determined. Feature vectors of the audio segments may be determined based on the Mel frequency spectral power features, the Mel frequency cepstral coefficient features, and the energy features. The feature vectors may be processed through a support vector machine. The support vector machine may output predictions on whether the audio segments contain speech. One or more of the audio segments may be identified as containing speech based on filtering the predictions and comparing the filtered predictions to a threshold. Storage of the identification of the one or more of the audio segments as containing speech in one or more storage media may be effectuated.

18 Claims, 7 Drawing Sheets

(56) References Cited

U.S. PATENT DOCUMENTS

| | | | |
|---|---|---|---|
| 2009/0222258 A1* | 9/2009 | Fukuda | G10L 25/93 704/203 |
| 2009/0313016 A1* | 12/2009 | Cevik | G10L 15/22 704/241 |
| 2012/0141017 A1* | 6/2012 | Krupka | G06K 9/00228 382/159 |
| 2013/0253920 A1* | 9/2013 | Lin | G10L 17/20 704/204 |
| 2014/0143579 A1* | 5/2014 | Grokop | G06F 9/4893 713/340 |
| 2015/0154980 A1* | 6/2015 | Khan | G10L 25/66 704/203 |
| 2015/0194147 A1* | 7/2015 | Yoon | G09B 19/06 704/236 |
| 2017/0018270 A1* | 1/2017 | Min | G10L 15/063 |
| 2017/0084264 A1* | 3/2017 | Kuo | H04R 3/002 |
| 2017/0358283 A1* | 12/2017 | Neuhauser | G10L 25/81 |
| 2018/0041639 A1* | 2/2018 | Gunawan | G10L 21/02 |

\* cited by examiner

SYSTEMS AND METHODS FOR IDENTIFYING SPEECH BASED ON CEPSTRAL COEFFICIENTS AND SUPPORT VECTOR MACHINES

FIELD

This disclosure relates to identifying speech using Mel frequency spectral power features, Mel frequency cepstral coefficient features, and energy features of audio segments.

BACKGROUND

Audio content may include capture of speech (spoken words). Computer identification of speech from other sounds in audio content may be difficult and/or inaccurate.

SUMMARY

Audio information defining audio content may be accessed. The audio content may have a duration. The audio content may be segmented into audio segments. Individual audio segments may correspond to a portion of the duration. The audio segments may include a first audio segment corresponding to a first portion of the duration. Mel frequency spectral power features, Mel frequency cepstral coefficient features, energy features, and/or other features of the audio segments may be determined. Mel frequency spectral power features may include a first Mel frequency spectral power feature of the first audio segment. Mel frequency cepstral coefficient features may include a first Mel frequency cepstral coefficient feature of the first audio segment. Energy features may include a first energy feature of the first audio segment.

Feature vectors of the audio segments may be determined based on the Mel frequency spectral power features, the Mel frequency cepstral coefficient features, the energy features, and/or other information. The feature vectors may include a first feature vector of the first audio segment determined based on the first Mel frequency spectral power feature, the first Mel frequency cepstral coefficient feature, the first energy feature, and/or other information. The feature vectors may be processed through a support vector machine. The support vector machine may output predictions on whether the audio segments contain speech. One or more of the audio segments may be identified as containing speech based on filtering the predictions, comparing the filtered predictions to a threshold, and/or other information. Storage of the identification of the one or more of the audio segments as containing speech in one or more storage media may be effectuated.

A system that identifies speech within audio content may include one or more electronic storage, processor and/or other components. The electronic storage may store audio information defining audio content and/or other information. Audio content may refer to media content that may be consumed as one or more sounds. Audio content may include one or more sounds stored in one or more formats/containers, and/or other audio content. Audio content may have a duration. In some implementations, audio content may include audio portion of video content. Audio content may be captured during capture of the video content.

The processor(s) may be configured by machine-readable instructions. Executing the machine-readable instructions may cause the processor(s) to facilitate identifying speech within audio content. The machine-readable instructions may include one or more computer program components.

The computer program components may include one or more of an audio information component, a segment component, a spectral power feature component, a cepstral coefficient feature component, an energy feature component, a feature vector component, a support vector machine component, a speech component, a storage component, and/or other computer program components.

The audio information component may be configured to access audio information defining one or more audio content and/or other information. The audio information component may access audio information from one or more locations. The audio information component may access audio information during acquisition of the audio content and/or after acquisition of the audio content by one or more sound sensors.

The segment component may be configured to segment the audio content into audio segments. Individual audio segments may corresponding to a portion of the duration of the audio content. The audio segments may include a first audio segment corresponding to a first portion of the duration and/or other audio segment(s) corresponding to other portion(s) of the duration. In some implementations, the audio content may be segmented into audio segments of a same segment duration. In some implementations, the same segment duration may be twenty-five milliseconds, fifty milliseconds, two-hundred milliseconds, one second, or other duration.

The spectral power feature component may be configured to determine Mel frequency spectral power features of the audio segments. The Mel frequency spectral power features may include a first Mel frequency spectral power feature of the first audio segment and/or other Mel frequency spectral power feature(s) of other audio segment(s). In some implementations, the Mel frequency spectral power features may be determined based on one or more sets of triangular filters. In some implementations, the Mel frequency spectral power features may be determined based on one or more logarithmic functions. In some implementations, the first Mel frequency spectral power feature may include twenty-six values.

The cepstral coefficient feature component may be configured to determine Mel frequency cepstral coefficient features of the audio segments. The Mel frequency cepstral coefficient features may include a first Mel frequency cepstral coefficient feature of the first audio segment and/or other Mel frequency cepstral coefficient feature(s) of other audio segment(s). In some implementations, the Mel frequency cepstral coefficient features may be determined based on one or more discrete cosine transforms of the Mel frequency spectral power features. In some implementations, the first Mel frequency cepstral coefficient feature may include thirteen values.

The energy feature component may be configured to determine energy features of the audio segments. The energy features may include a first energy feature of the first audio segment and/or other energy feature(s) of other audio segment(s). The energy features may characterize energy of the audio segments and/or other information. In some implementations, the first energy feature may include one value.

The feature vector component may be configured to determine feature vectors of the audio segments based on the Mel frequency spectral power features, the Mel frequency cepstral coefficient features, the energy features, and/or other information. The feature vectors may include a first feature vector of the first audio segment determined based on the first Mel frequency spectral power feature, the first Mel frequency cepstral coefficient feature, and the first energy feature, and/or other feature vector(s) of other audio segment(s). The first feature vector may include a combination of the first Mel frequency spectral power feature, the first Mel frequency cepstral coefficient feature, and the first energy feature.

In some implementations, the first feature vector may include forty values (e.g., twenty-six values from the first Mel frequency spectral power feature, thirteen values from the first Mel frequency cepstral coefficient feature, one value from the first energy feature).

The support vector machine component may be configured to process the feature vectors and/or other information through a support vector machine. In some implementations, a given number (e.g., five) of consecutive feature vectors may be combined for processing through the support vector machine. The support vector machine may output predictions on whether the audio segments contain speech and/or other information.

The speech component may be configured to identify one or more of the audio segments as containing speech. One or more of the audio segments may be identified as containing speech based on filtering the predictions and comparing the filtered predictions to a threshold and/or other information. In some implementations, filtering the predictions may include convolving the predictions with one or more uniform low-pass filters. In some implementations, the threshold may include a one-sided hysteresis threshold.

The storage component may be configured to effectuate storage of the identification of the one or more of the audio segments as containing speech and/or other information in one or more storage media. The storage component may effectuate storage of the identification of the one or more of the audio segments as containing speech and/or other information in one or more storage locations including the audio information and/or other storage locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 6 illustrates example support vector machine bias and weights.

DETAILED DESCRIPTION

Figure 1:
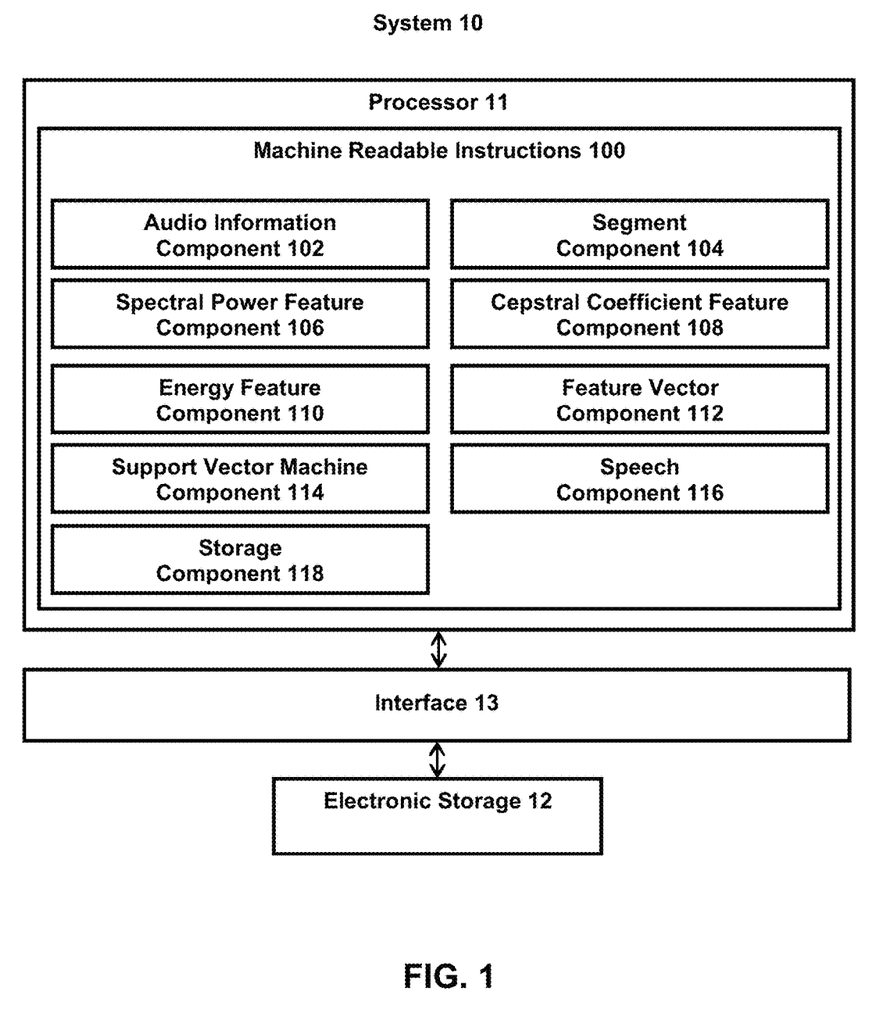
FIG. 1 illustrates a system that identifies speech within audio content.

FIG. 1 illustrates a system 10 for identifying speech within audio content. The system 10 may include one or more of a processor 11, an electronic storage 12, an interface 13 (e.g., bus, wireless interface), and/or other components. Audio information defining audio content may be accessed by the processor 11. The audio content may have a duration. The audio content may be segmented into audio segments. Individual audio segments may correspond to a portion of the duration. The audio segments may include a first audio segment corresponding to a first portion of the duration. Mel frequency spectral power features, Mel frequency cepstral coefficient features, energy features, and/or other features of the audio segments may be determined by the processor 11. Mel frequency spectral power features may include a first Mel frequency spectral power feature of the first audio segment. Mel frequency cepstral coefficient features may include a first Mel frequency cepstral coefficient feature of the first audio segment. Energy features may include a first energy feature of the first audio segment.

Feature vectors of the audio segments may be determined by the processor 11 based on the Mel frequency spectral power features, the Mel frequency cepstral coefficient features, the energy features, and/or other information. The feature vectors may include a first feature vector of the first audio segment determined based on the first Mel frequency spectral power feature, the first Mel frequency cepstral coefficient feature, the first energy feature, and/or other information. The feature vectors may be processed through a support vector machine. The support vector machine may output predictions on whether the audio segments contain speech. One or more of the audio segments may be identified as containing speech based on filtering the predictions, comparing the filtered predictions to a threshold, and/or other information. Storage of the identification of the one or more of the audio segments as containing speech in one or more storage media may be effectuated.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to audio information, audio content, audio segments, Mel frequency spectral power features, Mel frequency cepstral coefficient features, energy features, feature vectors, support vector machine, speech, predictions on whether audio segments contain speech, identification of audio segments as containing speech, speech counter, and/or other information.

For example, the electronic storage 12 may store audio information defining one or more audio content and/or other information. Audio content may refer to media content that may be consumed as one or more sounds, such as words, songs, vocal sounds, non-vocal sounds, and/or other sounds. Audio content may include recorded sounds (e.g., captured via one or more sound sensors), computer-generated sounds, processed sounds, and/or other sounds. Audio content may include one or more sounds stored in one or more formats/containers, and/or other audio content. A format may refer to one or more ways in which the information defining audio content is arranged/laid out (e.g., file format). A container may refer to one or more ways in which information defining audio content is arranged/laid out in association with other information (e.g., wrapper format).

Audio content may have a duration. A duration may be defined in terms of time durations and/or other metrics. For example, audio content may include captured audio having a time duration of 60 seconds. Other times durations are contemplated.

In some implementations, audio content may be associated with video content. For example, the audio content may be captured during/with capture of the video content. That is, audio content may be captured during/with capture of one or more videos by an image capture device (including optical element(s), image sensor(s), processor(s)). The audio content may be captured by one or more sound sensors of the image capture device (e.g., microphone of and/or coupled to the image capture device) and/or captured by one or more sound sensors separate from the image capture device (e.g., microphone separate from the image capture device). The audio content may be stored with the video content (e.g., audio content may include audio portion of the video content) and/or separately from the video content (e.g., audio file is separate from video file).

The sound(s) within the audio content may correspond the sound(s) that were captured when capturing the video content. For example, the video content may include a visual capture of an activity involving one or more persons and the audio content may include sound capture of the activity, which may include sounds produced by persons or non-persons (e.g., animals, machines, objects). One or more portions of the audio content may include capture of speech by one or more persons and/or other sounds. Speech may refer to vocal sounds made by a person. Speech may be directed to one or more persons or one or more non-persons. Speech may include part of a spoken word, one or more spoken words, and/or other vocal sounds.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate identifying speech within audio content. The machine readable instructions 100 may include one or more computer program components. The machine readable instructions 100 may include one or more of an audio information component 102, a segment component 104, a spectral power feature component 106, a cepstral coefficient feature component 108, an energy feature component 110, a feature vector component 112, a support vector machine component 114, a speech component 116, a storage component 118, and/or other computer program components.

The audio information component 102 may be configured to access audio information defining one or more audio content and/or other information. Accessing audio information may include one or more of acquiring, analyzing, determining, examining, loading, locating, obtaining, opening, receiving, retrieving, reviewing, storing, and/or otherwise accessing the audio information. The audio information component 102 may obtain audio information from one or more locations. For example, the audio information component 102 may access audio information from a storage location, such as the electronic storage 12, electronic storage of information and/or signals generated by one or more sound sensors (not shown in FIG. 1), electronic storage of a device accessible via a network, and/or other locations. The audio information component 102 may obtain audio information from one or more hardware components (e.g., a sound sensor) and/or one or more software components (e.g., software running on a computing device).

The audio information component 102 may be configured to access audio information during acquisition of the audio content and/or after acquisition of the audio content by one or more sound sensors. For example, the audio information component 102 may access audio information while the sounds are being captured by one or more sound sensors. The audio information component 102 may access audio information defining sounds after the sounds have been captured and stored in memory (e.g., the electronic storage 12). For example, the processor 11 may be included within an image capture device that captures video content and the audio information component 102 may access audio information defining audio content for the video content during/after acquisition of the video content. As another example, the processor 11 may be included within a mobile/desktop device and the audio information component 102 may access audio information defining audio content for video content based on access of the video content by the mobile/desktop device.

In some implementations, the audio information may be accessed based on user interaction with a user interface/application (e.g., video editing application, audio editing application), and/or other information. For example, a user interface/application may provide option(s) for a user to select one or more audio content from which speech is to be detected. The audio information defining the audio content may be obtained based on the user's selection of the audio content and/or the video content including/associated with the audio content through the user interface/application. For example, the audio information may be accessed based on user selection (via user interface/application) of an audio file or a video file including/associated with an audio file/portion.

The segment component 104 may be configured to segment the audio content into audio segments. Individual audio segments may corresponding to a portion of the duration of the audio content. For example, the audio segments may include a given audio segment corresponding to a given portion of the duration and/or other audio segment(s) corresponding to other portion(s) of the duration. In some implementations, the audio content may be segmented into audio segments of a same segment duration or different segment durations. In some implementations, the same segment duration may be twenty-five milliseconds, fifty milliseconds, two-hundred milliseconds, one second, or other duration.

Figure 3:
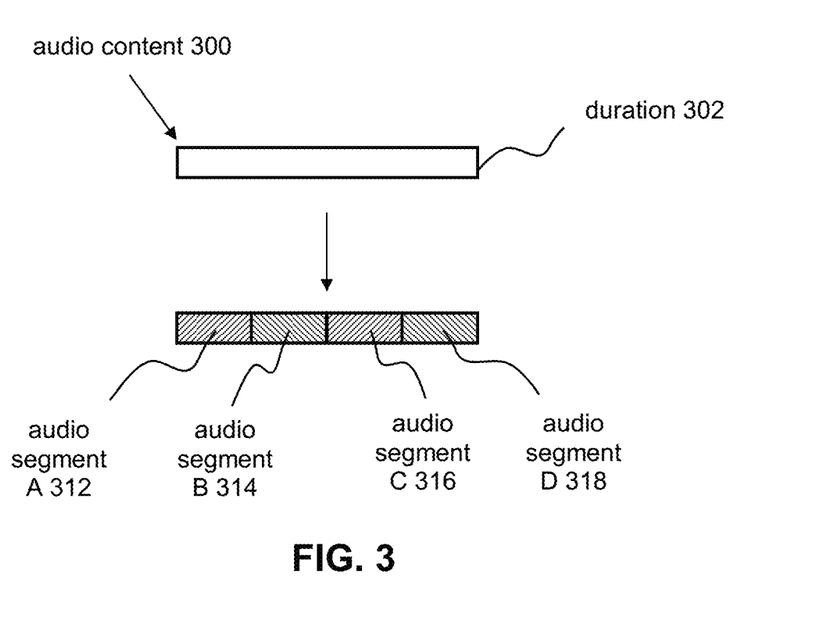
FIG. 3 illustrates an example segmentation of audio content.

For example, FIG. 3 illustrates example segmentation of audio content 300. The audio content 300 may have a duration 302. The segment component 104 may segment the audio content 300 into audio segment A 312, audio segment B 314, audio segment C 316, audio segment D 318, and/or other audio segments. The audio segment A 312, the audio segment B 314, the audio segment 316, and the audio segment D 318 may be of a same segment duration (e.g., fifty milliseconds) or different segment durations. In some implementations, audio segments segmented by the segmentation component 104 may include overlap between adjacent audio segments. In some implementations, audio segments segmented by the segmentation component 104 may not include overlap between adjacent audio segments. Other segmentation of audio content are contemplated.

Segmentation of the audio content may provide for preservation of frequency contours within the signal of the audio content during sound analysis/processing. For example, performing Fourier transform over the entire duration of the audio content (entire signal) may result in loss of the frequency contours of the audio signal over time. Performing Fourier transform over the audio segments (of short time duration) may provide an approximation of the frequency contours of the signal.

The spectral power feature component 106 may be configured to determine Mel frequency spectral power features (logarithmic filter bank features) of the audio segments. The Mel frequency spectral power features may include a first Mel frequency spectral power feature of the first audio segment and/or other Mel frequency spectral power feature(s) of other audio segment(s). The Mel frequency spectral power features may be determined based on one or more sets of triangular filters, one or more logarithmic functions, and/or other information.

For example, f(x) may represent a signal for $\chi \in ]-\infty, +\infty[$. The Fourier transform of f, denoted by $\hat{f}$, may be represented as:

$$\forall \xi \in ]-\infty, +\infty[, \hat{f}(\xi) = \int_{-\infty}^{+\infty} f(x)e^{-2\pi i x \xi} dx.$$

Figure 4:
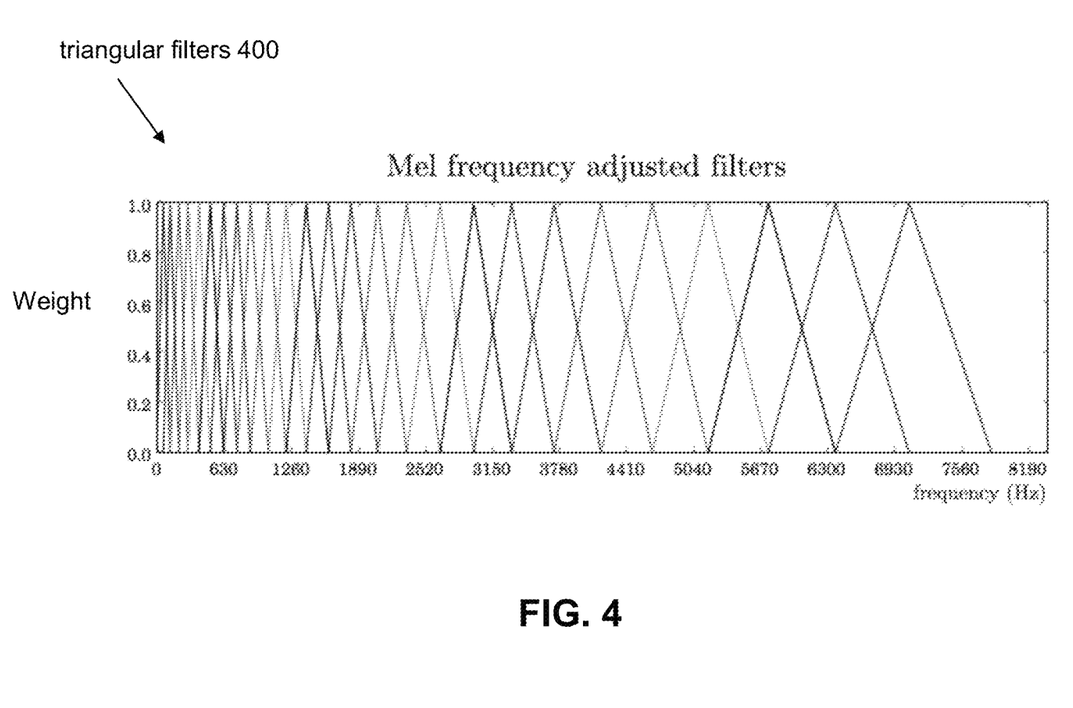
FIG. 4 illustrates an example set of triangular filters for Mel frequency spectral power features determination.

A set of triangular filters, such as triangular filters 400 shown in FIG. 4, may be obtained (e.g., accessed, acquired, computed, determined, loaded, located, opened, received, retrieved, stored). For $i \in [[0,25]]$, corresponding filter support functions may be represented as $H_i$. The center of individual filters may be given by:

$$c_i = \left\lfloor \alpha \frac{2049 \times 32000}{44100^2} \times \left(700 \times 10^{\frac{ih}{27 \times 2595}} - 1\right) \right\rfloor,$$

where h=2595×log$_{10}$(1+22050) and $$\alpha = \frac{s}{44100},$$

while s represents the sampling rate of the (discrete audio sound) signal f.

Computation of the Fourier transform using a Fast Fourier Transform algorithm (e.g., from libav) may provide a spectrum, $\hat{f}(\xi)$ for $\xi \in [[0,T]]$ where T is 2047. The signal and the spectrum may be discrete. The filter functions $H_i$ may be sampled to provide discrete versions, $H_i(\xi)$, for $\xi \in [[0,T]]$. The spectrum and the filters may cover a frequency window of a given size (e.g., [0, 22050] Hz]). The power spectrum may be computed as:

$$E_s(\xi) = \hat{f}(\xi)^2.$$

The function $E_s$ may be convolved with individual filter $H_i$ to obtain the Mel frequency adjusted spectral powers $E_i^M$. The Mel frequency spectral power features may be the logarithm of the Mel frequency adjusted spectral powers $E_i^M$:

$\log_{10}(E_i^M)$ for $i \in [[0,25]]$.

Other determinations of Mel frequency spectral power features of the audio segments are contemplated. In some implementations, a given Mel frequency spectral power feature may include twenty-six values. Other numbers of values within a given Mel frequency spectral power feature are contemplated.

The cepstral coefficient feature component 108 may be configured to determine Mel frequency cepstral coefficient features of the audio segments. The Mel frequency cepstral coefficient features may include a first Mel frequency cepstral coefficient feature of the first audio segment and/or other Mel frequency cepstral coefficient feature(s) of other audio segment(s). The Mel frequency cepstral coefficient features may be determined based on one or more discrete cosine transforms (e.g., orthogonal type II discrete cosine transform) of the Mel frequency spectral power features. For example, the Mel frequency cepstral coefficient features, represented as Mi, for $i \in [[0,12]]$, may be computed as:

$$M_i = \frac{1}{\sqrt{52 + 52 \times 1_{i=0}}} \sum_{k=0}^{25} 2 \times \log_{10}(E_i^M) \cos\left(\pi \frac{i \times (2k+1)}{52}\right).$$

Other determinations of Mel frequency cepstral coefficient features are contemplated. In some implementations, a given Mel frequency cepstral coefficient feature may include thirteen values. Other numbers of values within a given Mel frequency cepstral coefficient feature are contemplated.

The energy feature component 110 may be configured to determine energy features of the audio segments. For example, the energy features may include a given energy feature of a given audio segment and/or other energy feature(s) of other audio segment(s). The energy features may characterize energy of the audio segments and/or other information. For example, the energy features include energy of the spectrum, which may be computed as:

$$E = \sum_{\xi=0}^{25} E_s(\xi).$$

Other determinations of energy features of the audio segments are contemplated. In some implementations, a given energy feature may include one value. Other numbers of values within a given energy feature are contemplated.

Figure 5:
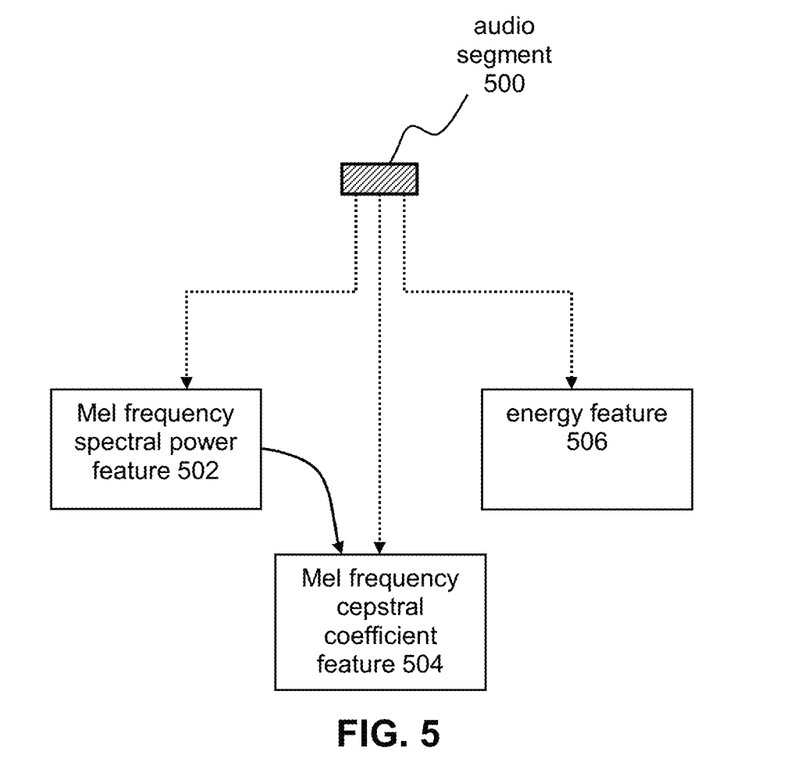
FIG. 5 illustrates example audio segment feature extractions.

FIG. 5 illustrates example feature extractions from an audio segment 500 of audio content. As shown in FIG. 5, the spectral power feature component 106 may determine Mel frequency spectral power feature 502 of the audio segment 500. The cepstral coefficient feature component 108 may determine Mel frequency cepstral coefficient feature 504 of the audio segment 500 (e.g., based on the Mel frequency spectral power feature 502). The energy feature component 110 may determine energy feature 506 of the audio segment 500. The energy feature 506 may characterize energy of the audio segment 500.

The feature vector component 112 may be configured to determine feature vectors of the audio segments based on the Mel frequency spectral power features, the Mel frequency cepstral coefficient features, the energy features, and/or other information. The feature vectors may include a first feature vector of the first audio segment determined based on the first Mel frequency spectral power feature, the first Mel frequency cepstral coefficient feature, and the first energy feature, and/or other feature vector(s) of other audio segment(s). A given feature vector (e.g., first feature vector) may include a combination of a given Mel frequency spectral power feature (e.g., first Mel frequency spectral power feature), a given Mel frequency cepstral coefficient feature (first Mel frequency cepstral coefficient feature), and a given energy feature (first energy feature). For example, the feature vector component 112 may determine feature vectors of a given audio segment by appending the values of the given Mel frequency spectral power feature, the given Mel frequency cepstral coefficient feature, and the given energy feature together.

In some implementations, a given feature vector may include forty values (e.g., twenty-six values from the Mel frequency spectral power feature, thirteen values from the Mel frequency cepstral coefficient feature, one value from the energy feature). Other numbers of values within a given feature vector are contemplated.

The support vector machine component 114 may be configured to process the feature vectors and/or other information through a support vector machine. The support vector machine may be a supervised learning model with associated learning algorithm. The support vector machine may be used for classification and/or regression. In some implementations, the support vector machine may be trained with one or more data sets (e.g., audio data sets including videos marked as containing/not containing speech). Example bias and weight for the support vector machine are provided in FIG. 6.

The support vector machine may output predictions on whether the audio segments contain speech based on the inputted feature vectors and/or other information. The predictions may provide one or more probability measures of the audio segments containing speech. For example, for a given feature vector of a given audio segment, the support vector machine may output a prediction on whether the given audio segment contains speech.

In some implementations, the support vector machine component 114 may combine a given number (e.g., five) of consecutive feature vectors for processing through the support vector machine. For example, feature vector component 112 may determine a series of feature vectors, represented as $F_i$, for $i \in [[0,W[[$, where W is the number of windows (audio segments). Combining five consecutive feature vectors of the series of feature vectors may result in a combined feature vector including two-hundred values (five times forty values in individual feature vectors).

The trained support vector machine may be applied to the feature vectors/combined feature vectors after normalization by a trained scaler (first) and norm 2 (after) to obtain a series of prediction. For example, based on application of the trained support vector machine to the combined feature vector (combining five consecutive feature vectors), a series of predictions (one for individual pack of five audio segments) may be obtained as $P_i$, for $i \in [[0,W/5[[$.

Figure 7:
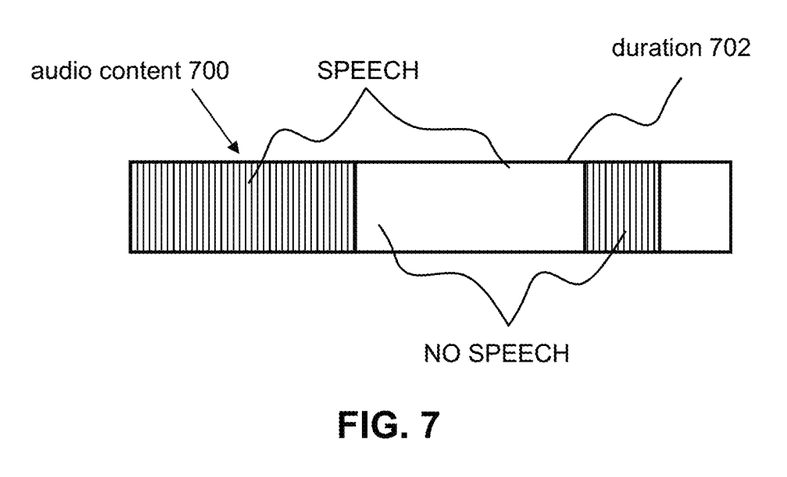
FIG. 7 illustrates example identification of audio segments as containing speech.

The speech component 116 may be configured to identify one or more of the audio segments as containing speech. The speech component 116 may identify one or more of the audio segments as containing speech based on filtering the predictions and comparing the filtered predictions to a threshold and/or other information. Filtering the predictions may include convolving the predictions with one or more uniform low-pass filters (e.g., a uniform low-pass filter of size five), which may provide a filtered prediction series P'. Comparison of the filtered predictions to the threshold (e.g., dynamic threshold and/or static threshold) may effectuate application of a voting rule to the filtered predictions to determine whether the predictions will result in identification of audio segments as containing speech or not containing speech. For example, FIG. 7 illustrates an example audio content 700 having a duration 702, with different portions identified as containing speech and no speech. The speech component 116 may identify the portions (audio segments) of the audio content 700 as containing speech based on the comparison of the filtered predictions to a threshold (e.g., one-sided hysteresis threshold).

In some implementations, the threshold may include a one-sided hysteresis threshold. The one-sided hysteresis threshold may provide for smoothing of the speech/no-speech identification. The one-sided hysteresis may be adaptive to the processed signal (e.g., using current noise to adapt the threshold for classification as audio content is processed, which accounts for noise in the audio content). As an example, the one-sided hysteresis threshold may provide that if $P_i'$ is greater than a first threshold ($t_0$), then the audio segment is identified as containing speech (e.g., enter speech mode). The subsequent audio segments may be identified as containing speech until $P_j'$ is less than a second threshold ($t_1$), where j is greater than i and $t_0 > t_1$. Other types of/rules for one-sided hysteresis threshold are contemplated.

In some implementations, the threshold values used may be specifically modified (biased and/or scaled) from a classic hyperplane distance to account for disparities between the learning test set and real-life examples and/or particularities of the audio/video content, alongside with video/audio-edit based algorithms requirements, such as underlying video edit quality requirements.

In some implementations, the identification of audio segments as containing speech may be smoothed based on a number of silent/speech audio segments. For example, simply marking certain audio segments as containing speech based on the comparison of the filtered predictions to a threshold may result in undesirable breaks in speech labeling. For example, the audio content may include capture of a person speaking with a short pause. It may be desirable to mark such short pause in speech as containing speech to provide for a continuity of labeling for the entire speech. The speech component 116 may smooth the identification of audio segments as containing speech so that once speech is identified in the audio content, a certain consecutive number (e.g., 25) of audio segments following the speech must be identified as not containing speech (e.g., silence) to change the marking of the audio segments as containing speech to not containing speech (e.g., need 25 continuous silent audio segments to identify a change from speech to no speech). For example, based on identification of speech at a certain duration within the audio content, a break in speech following that duration may be required to be for a certain length of time (e.g., 1.25 seconds) to change the identification from speech to no speech.

As another example, the audio content may include a short audio segment that is marked as containing speech, surrounded by audio segments containing no speech. Such a short segment may correspond to a false positive (false speech detection) or a capture of an unintended speech. It may be desirable to mark such short audio segment as not containing speech. The speech component 116 may smooth the identification of audio segments as containing speech so that once lack of speech is identified in the audio content, a certain consecutive number (e.g., 5) of audio segments following the lack of speech must be identified as containing speech to change the marking of the audio segments as not containing speech to containing speech (e.g., need 5 continuous speech audio segments to identify a change from no speech to speech). For example, based on identification of lack of speech at a certain duration within the audio content, a speech following that duration may be required to be for a certain length of time (e.g., 0.25 second) to change the identification from no speech to speech.

The identification of the one or more of the audio segments as containing speech may be used to identify one or more moments within the audio content and/or one or more moments within the associated video content (e.g., identifying time portions of a video based on speech contained within audio of the video). For example, the identification of audio segments containing speech may be used to trim the audio content and/or the associated video content to remove undesirable portions (e.g., too noisy) and/or to keep desirable portions (e.g., moments of interest). The identification of audio segments containing speech may be used to emphasize certain portions of the video content. For example, visual effects (e.g., color changes, pixel manipulation, transitions) may be added to the video content based on the identification of audio segments containing speech (e.g., add transitions between/during speech). The video content may be played back with musical track (e.g., video content may be synchronized for playback with musical track) and the identification of audio segments (audio portions of the video content) containing speech may be used to include the speech during playback so that the speech is heard above/in place of the musical track (audio portion of the video content plays on top of or replaces the musical track for a duration; volume of the audio portion of the video content is increased).

The storage component 118 may be configured to effectuate storage of the identification of the one or more of the audio segments as containing speech and/or other information in one or more storage media. The identification of the one or more of the audio segments as containing speech may be stored with the audio content, separately from the audio content, with the associated video content, separately from the associated video content, and/or in other forms. In some implementations, the identification of the one or more of the audio segments as containing speech may be stored within a file (e.g., director track) that describes how the audio content and/or the associated video content may be presented during playback.

In some implementations, the storage component 118 may effectuate storage of the identification of the one or more of the audio segments as containing speech in one or more storage locations including the audio information and/or other storage locations. For example, the audio information may have been accessed from the electronic storage 12 and the identification of the one or more of the audio segments as containing speech may be stored in the electronic storage 12. In some implementations, the storage component 118 may effectuate storage of the identification of the one or more of the audio segments as containing speech in one or more remote storage locations (e.g., storage media located at/accessible through a server). In some implementations, the storage component 118 may effectuate storage of the identification of the one or more of the audio segments as containing speech through one or more intermediary devices. Other storage locations for and storage of the identification of the one or more of the audio segments as containing speech are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 12, and the display 14 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
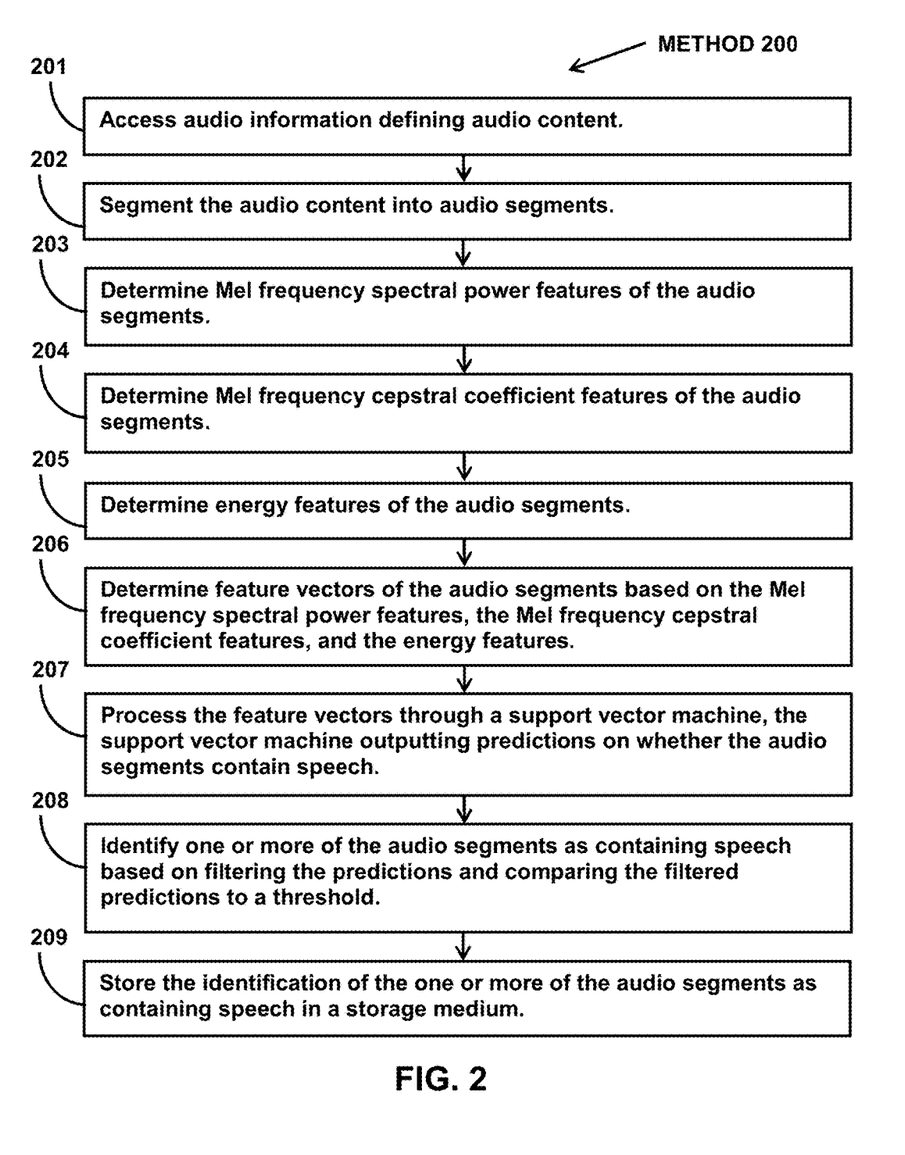
FIG. 2 illustrates a method for identifying speech within audio content.

FIG. 2 illustrates method 200 for identifying speech within audio content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, audio information defining audio content may be accessed. The audio content may have a duration. In some implementation, operation 201 may be performed by a processor component the same as or similar to the audio information component 102 (Shown in FIG. 1 and described herein).

At operation 202, the audio content may be segmented into audio segments. Individual audio segments may correspond to a portion of the duration. In some implementations, operation 202 may be performed by a processor component the same as or similar to the segment component 104 (Shown in FIG. 1 and described herein).

At operation 203, Mel frequency spectral power features of the audio segments may be determined. In some implementations, operation 203 may be performed by a processor component the same as or similar to the spectral power feature component 106 (Shown in FIG. 1 and described herein).

At operation 204, Mel frequency cepstral coefficient features of the audio segments may be determined. In some implementations, operation 204 may be performed by a processor component the same as or similar to the cepstral coefficient feature component 108 (Shown in FIG. 1 and described herein).

At operation 205, energy features of the audio segments may be determined. In some implementations, operation 205 may be performed by a processor component the same as or similar to the energy feature component 110 (Shown in FIG. 1 and described herein).

At operation 206, feature vectors of the audio segments may be determined based on the Mel frequency spectral power features, the Mel frequency cepstral coefficient features, and the energy features. In some implementations, operation 206 may be performed by a processor component the same as or similar to the feature vector component 112 (Shown in FIG. 1 and described herein).

At operation 207, the feature vectors may be processed through a support vector machine. The support vector machine may output predictions on whether the audio segments contain speech. In some implementations, operation 207 may be performed by a processor component the same as or similar to the support vector machine component 114 (Shown in FIG. 1 and described herein).

At operation 208, one or more of the audio segments may be identified as containing speech based on filtering the predictions and comparing the filtered predictions to a threshold. In some implementations, operation 208 may be performed by a processor component the same as or similar to the speech component 116 (Shown in FIG. 1 and described herein).

At operation 209, the identification of the one or more of the audio segments as containing speech may be stored in a storage medium. In some implementations, operation 209 may be performed by a processor component the same as or similar to the storage component 118 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that identifies speech, the system comprising:
one or more physical processors configured by machine-readable instructions to:
access audio information defining audio content, the audio content having a duration;
segment the audio content into audio segments, individual audio segments corresponding to a portion of the duration, the audio segments including a first audio segment corresponding to a first portion of the duration;
determine Mel frequency spectral power features of the audio segments, the Mel frequency spectral power features including a first Mel frequency spectral power feature of the first audio segment;

determine Mel frequency cepstral coefficient features of the audio segments, the Mel frequency cepstral coefficient features including a first Mel frequency cepstral coefficient feature of the first audio segment;

determine energy features of the audio segments, the energy features including a first energy feature of the first audio segment;

determine feature vectors of the audio segments based on the Mel frequency spectral power features, the Mel frequency cepstral coefficient features, and the energy features, the feature vectors including a first feature vector of the first audio segment determined based on the first Mel frequency spectral power feature, the first Mel frequency cepstral coefficient feature, and the first energy feature, wherein the first Mel frequency spectral power feature includes twenty-six values, the first Mel frequency cepstral coefficient feature includes thirteen values, and the first energy feature includes one value;

process the feature vectors through a support vector machine, the support vector machine outputting predictions on whether the audio segments contain speech;

identify one or more of the audio segments as containing speech based on filtering the predictions and comparing the filtered predictions to a threshold; and effectuate storage of the identification of the one or more of the audio segments as containing speech in a storage medium.

2. The system of claim 1, wherein the audio content is segmented into the audio segments of a same segment duration.

3. The system of claim 2, wherein the same segment duration is twenty-five milliseconds, fifty milliseconds, two-hundred milliseconds, or one second.

4. The system of claim 1, wherein the Mel frequency spectral power features are determined based on a set of triangular filters.

5. The system of claim 4, wherein the Mel frequency spectral power features are further determined based on a logarithmic function.

6. The system of claim 1, wherein the Mel frequency cepstral coefficient features are determined based on a discrete cosine transform of the Mel frequency spectral power features.

7. The system of claim 1, wherein a given number of consecutive feature vectors are combined for processing through the support vector machine.

8. The system of claim 1, wherein filtering the predictions includes convolving the predictions with a uniform low-pass filter.

9. The system of claim 1, wherein the threshold includes a one-sided hysteresis threshold.

10. A method that identifies speech, the method comprising:

accessing audio information defining audio content, the audio content having a duration;

segmenting the audio content into audio segments, individual audio segments corresponding to a portion of the duration, the audio segments including a first audio segment corresponding to a first portion of the duration;

determining Mel frequency spectral power features of the audio segments, the Mel frequency spectral power features including a first Mel frequency spectral power feature of the first audio segment;

determining Mel frequency cepstral coefficient features of the audio segments, the Mel frequency cepstral coefficient features including a first Mel frequency cepstral coefficient feature of the first audio segment;

determining energy features of the audio segments, the energy features including a first energy feature of the first audio segment;

determining feature vectors of the audio segments based on the Mel frequency spectral power features, the Mel frequency cepstral coefficient features, and the energy features, the feature vectors including a first feature vector of the first audio segment determined based on the first Mel frequency spectral power feature, the first Mel frequency cepstral coefficient feature, and the first energy feature, wherein the first Mel frequency spectral power feature includes twenty-six values, the first Mel frequency cepstral coefficient feature includes thirteen values, and the first energy feature includes one value;

processing the feature vectors through a support vector machine, the support vector machine outputting predictions on whether the audio segments contain speech;

identifying one or more of the audio segments as containing speech based on filtering the predictions and comparing the filtered predictions to a threshold; and effectuating storage of the identification of the one or more of the audio segments as containing speech in a storage medium.

11. The method of claim 10, wherein the audio content is segmented into the audio segments of a same segment duration.

12. The method of claim 11, wherein the same segment duration is twenty-five milliseconds, fifty milliseconds, two-hundred milliseconds, or one second.

13. The method of claim 10, wherein the Mel frequency spectral power features are determined based on a set of triangular filters.

14. The method of claim 13, wherein the Mel frequency spectral power features are further determined based on a logarithmic function.

15. The method of claim 10, wherein the Mel frequency cepstral coefficient features are determined based on a discrete cosine transform of the Mel frequency spectral power features.

16. The method of claim 10, wherein a given number of consecutive feature vectors are combined for processing through the support vector machine.

17. The method of claim 10, wherein filtering the predictions includes convolving the predictions with a uniform low-pass filter.

18. The method of claim 10, wherein the threshold includes a one-sided hysteresis threshold.

* * * * *